(12) United States Patent
Li et al.

(10) Patent No.: US 9,804,682 B2
(45) Date of Patent: *Oct. 31, 2017

(54) SYSTEMS AND METHODS FOR PERFORMING MULTI-TOUCH OPERATIONS ON A HEAD-MOUNTABLE DEVICE

(71) Applicant: Google Inc., Mountain View, CA (US)

(72) Inventors: Chun Yat Frank Li, Mountain View, CA (US); Hayes Solos Raffle, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/012,426

(22) Filed: Feb. 1, 2016

(65) Prior Publication Data

US 2016/0147309 A1    May 26, 2016

Related U.S. Application Data

(63) Continuation of application No. 14/084,674, filed on Nov. 20, 2013, now Pat. No. 9,261,700, and a
(Continued)

(51) Int. Cl.
*G06F 3/01* (2006.01)
*G02B 27/01* (2006.01)
(Continued)

(52) U.S. Cl.
CPC ........... *G06F 3/017* (2013.01); *G02B 27/017* (2013.01); *G02B 27/0176* (2013.01);
(Continued)

(58) Field of Classification Search
CPC .......... G02B 27/017; G02B 2027/0178; G02B 2027/0138; G02B 2027/014;
(Continued)

(56) References Cited

U.S. PATENT DOCUMENTS 4,076,262 A   2/1978   Deventer
5,128,671 A   7/1992   Thomas
(Continued)

FOREIGN PATENT DOCUMENTS

CN   101785046 A   7/2010
CN   101924816 A   12/2010
(Continued)

OTHER PUBLICATIONS

Sone et al., Translation of JP 2009-080242, Sep. 26, 2012.*
(Continued)

*Primary Examiner* — Dmitriy Bolotin
(74) *Attorney, Agent, or Firm* — McDonnell Boehnen Hulbert & Berghoff LLP

(57) ABSTRACT

Embodiments described herein may provide a configuration of input interfaces used to perform multi-touch operations. An example device may involve: (a) a housing arranged on a head-mountable device, (b) a first input interface arranged on either a superior or an inferior surface of the housing, (c) a second input interface arranged on a surface of the housing that is opposite to the first input interface, and (d) a control system configured to: (1) receive first input data from the first input interface, where the first input data corresponds to a first input action, and in response, cause a camera to perform a first operation in accordance with the first input action, and (2) receive second input data from the second input interface, where the second input data corresponds to a second input action(s) on the second input interface, and in response, cause the camera to perform a second operation.

14 Claims, 13 Drawing Sheets

Related U.S. Application Data continuation of application No. PCT/US2014/063123, filed on Oct. 30, 2014.

(51) Int. Cl.

| | | |
|---|---|---|
| *G06F 3/041* | (2006.01) | |
| *G06F 3/0354* | (2013.01) | |
| *G06F 1/16* | (2006.01) | |
| *G06F 3/16* | (2006.01) | |

(52) U.S. Cl.
CPC .............. *G06F 1/163* (2013.01); *G06F 3/012* (2013.01); *G06F 3/013* (2013.01); *G06F 3/03547* (2013.01); *G06F 3/041* (2013.01); *G06F 3/165* (2013.01); *G02B 2027/014* (2013.01); *G02B 2027/0138* (2013.01); *G02B 2027/0161* (2013.01); *G02B 2027/0178* (2013.01); *G02B 2027/0187* (2013.01); *G06F 2203/04104* (2013.01)

(58) Field of Classification Search
CPC .... G02B 2027/0187; G02B 2027/0161; G02B 27/0176; G06F 3/012; G06F 3/013; G06F 3/041; G06F 3/03547; G06F 2203/04104; G06F 1/163; G06F 3/017; G06F 3/165
USPC ...................... 345/8, 173.174, 156
See application file for complete search history.

(56) References Cited

U.S. PATENT DOCUMENTS

| | | | |
|---|---|---|---|
| 5,494,447 | A | 2/1996 | Zaidan |
| 5,543,588 | A | 8/1996 | Bisset et al. |
| 5,610,971 | A | 3/1997 | Vandivier |
| 5,623,280 | A | 4/1997 | Akins et al. |
| 5,729,219 | A | 3/1998 | Armstrong et al. |
| 5,795,300 | A | 8/1998 | Bryars |
| 5,832,296 | A | 11/1998 | Wang et al. |
| 5,896,575 | A | 4/1999 | Higginbotham et al. |
| 5,898,600 | A | 4/1999 | Isashi |
| 5,959,260 | A | 9/1999 | Hoghooghi et al. |
| 6,215,461 | B1 | 4/2001 | Ishibashi et al. |
| 6,599,241 | B1 | 7/2003 | Murphy |
| 8,430,507 | B2 | 4/2013 | Howell et al. |
| 8,553,910 | B1 | 10/2013 | Dong et al. |
| 8,717,254 | B1 | 5/2014 | Nave et al. |
| 8,873,147 | B1 | 10/2014 | Rhodes et al. |
| D716,759 | S * | 11/2014 | Ha .............................. D14/205 |
| 8,902,315 | B2 | 12/2014 | Fisher et al. |
| 9,081,542 | B2 | 7/2015 | Dickinson et al. |
| 9,219,647 | B2 * | 12/2015 | Fisher ................ H04L 41/0809 |
| 9,261,700 | B2 * | 2/2016 | Li ........................ G02B 27/017 |
| 2005/0174470 | A1 | 8/2005 | Yamasaki |
| 2005/0195277 | A1 | 9/2005 | Yamasaki |
| 2006/0152618 | A1 | 7/2006 | Yamasaki |
| 2009/0199130 | A1 | 8/2009 | Tsern et al. |
| 2010/0007618 | A1 * | 1/2010 | Park ....................... G06F 1/1626 345/173 |
| 2010/0020034 | A1 | 1/2010 | Kim |
| 2010/0079356 | A1 | 4/2010 | Hoellwarth |
| 2010/0110368 | A1 | 5/2010 | Chaum |
| 2010/0149073 | A1 | 6/2010 | Chaum et al. |
| 2010/0177599 | A1 | 7/2010 | Pan |
| 2010/0245585 | A1 * | 9/2010 | Fisher ................. H04M 1/6066 348/164 |
| 2011/0007035 | A1 | 1/2011 | Shai |
| 2011/0194029 | A1 | 8/2011 | Herrmann et al. |
| 2011/0310318 | A1 | 12/2011 | Kawagoe |
| 2012/0299870 | A1 | 11/2012 | Chi et al. |
| 2013/0214998 | A1 | 8/2013 | Andes et al. |
| 2013/0235331 | A1 | 9/2013 | Heinrich et al. |
| 2013/0249776 | A1 | 9/2013 | Olsson et al. |
| 2013/0258270 | A1 | 10/2013 | Cazalet et al. |
| 2014/0269425 | A1 * | 9/2014 | Fisher ................. H04L 41/0809 370/254 |
| 2015/0085059 | A1 * | 3/2015 | Fisher ................. H04M 1/6066 348/14.02 |
| 2015/0133190 | A1 * | 5/2015 | Fisher ................. H04M 1/6066 455/556.1 |
| 2015/0234513 | A1 | 8/2015 | Jiang et al. |
| 2015/0261347 | A1 * | 9/2015 | Sugita ..................... G06F 3/044 345/174 |

FOREIGN PATENT DOCUMENTS

| | | |
|---|---|---|
| JP | 2009080242 A | 4/2009 |
| JP | 2012053366 A | 3/2012 |
| JP | 4952204 B2 | 6/2012 |
| JP | 5034825 B2 | 9/2012 |

OTHER PUBLICATIONS

International Search Report and Written Opinion of International Application No. PCT/US2014/063123 dated Jan. 27, 2015, 12 pages.

Unpublished U.S. Appl. No. 13/918,367, filed Jun. 14, 2013 entitled "Smart Housing for Extended Trackpad Sensing".

Unpublished U.S. Appl. No. 13/290,612, filed Nov. 7, 2011 entitled "Edgerule Text Input on Touch Sensitive Screen".

First Office Action, and translation thereof, from counterpart Chinese Patent Application No. 201380045474.1, dated Oct. 9, 2016, 17 pp.

* cited by examiner

SYSTEMS AND METHODS FOR PERFORMING MULTI-TOUCH OPERATIONS ON A HEAD-MOUNTABLE DEVICE

CROSS-REFERENCE TO RELATED APPLICATIONS

This application is a continuation of U.S. patent application Ser. No. 14/084,674, filed on Nov. 20, 2013, and entitled "Systems and Methods for Performing Multi-Touch Operations on a Head-Mountable Device." This application is also a continuation of international application PCT/US2014/063123, filed on Oct. 30, 2014, which claims benefit of U.S. patent application Ser. No. 14/084,674, both of which are herein incorporated by reference as if fully set forth in this description.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

Example embodiments may help to provide an ergonomic configuration of input interfaces in a computing device, such as a head-mountable device (HMD). In particular, a first input interface may be arranged on a top, a bottom, or a side surface of a housing that is attached to or part of an HMD. A second input interface may be arranged on a surface of the housing opposite to the first input interface. A control system may be in communication with the first and second input interfaces and may receive data from one or both of the interfaces corresponding to inputs at the interfaces. The control system may then cause a camera of the HMD to perform one or more operations in response to the received data.

In one aspect, a device may include: (a) a head-mountable frame including a housing arranged on at least one side arm, (b) a first input interface arranged on either a superior surface or an inferior surface of the housing, (c) a second input interface arranged on a surface of the housing that is opposite to the first input interface, and (d) a control system configured to: (1) receive first input data from the first input interface, where the first input data corresponds to a first input action, and responsive to the receipt of the first input data, cause a camera of the device to perform a first camera operation in accordance with the first input action, and (2) receive second input data from the second input interface, where the second input data corresponds to one or more second input actions on the second input interface, and responsive to the receipt of the second input data, cause the camera to perform a second camera operation that is different from the first camera operation.

In another aspect, a method may involve: (a) receiving first input data from a first input interface that corresponds to a first input action, where the first input interface is arranged on either a superior surface or an inferior surface of a housing, and where the housing is arranged on at least one side arm of a head-mountable frame of a device, (b) responsive to the receipt of the first input data, causing a camera of the device to perform a first camera operation in accordance with the first input action, (c) receiving second input data from a second input interface that corresponds to a second input action, where the second input interface is arranged on a surface of the housing that is opposite to the first input interface, and (d) responsive to the receipt of the second input data, causing the camera to perform a second camera operation that is different from the first camera operation.

In another aspect, a non-transitory computer readable medium has stored therein instructions executable by a computing device to cause the computing device to perform functions comprising: (a) receiving first input data from a first input interface that corresponds to a first input action, where the first input interface is arranged on either a superior surface or an inferior surface of a housing, and where the housing is arranged on at least one side arm of a head-mountable frame of a device, (b) responsive to the receipt of the first input data, causing a camera of the device to perform a first camera operation in accordance with the first input action, (c) receiving second input data from a second input interface that corresponds to a second input action, where the second input interface is arranged on a surface of the housing that is opposite to the first input interface, and (d) responsive to the receipt of the second input data, causing the camera to perform a second camera operation that is different from the first camera operation.

In a further aspect, a system may include: (a) means for receiving first input data from a first input interface that corresponds to a first input action, wherein the first input interface is arranged on either a superior surface or an inferior surface of a housing, and wherein the housing is arranged on at least one side arm of a head-mountable frame of a device, (b) means for, responsive to the receipt of the first input data, causing a camera of the device to perform a first camera operation in accordance with the first input action, (c) means for receiving second input data from a second input interface that corresponds to a second input action, wherein the second input interface is arranged on a surface of the housing that is opposite to the first input interface, and (d) means for, responsive to the receipt of the second input data, causing the camera to perform a second camera operation that is different from the first camera operation.

These as well as other aspects, advantages, and alternatives will become apparent to those of ordinary skill in the art by reading the following detailed description, with reference where appropriate to the accompanying drawings.

DETAILED DESCRIPTION

Figure 1A:
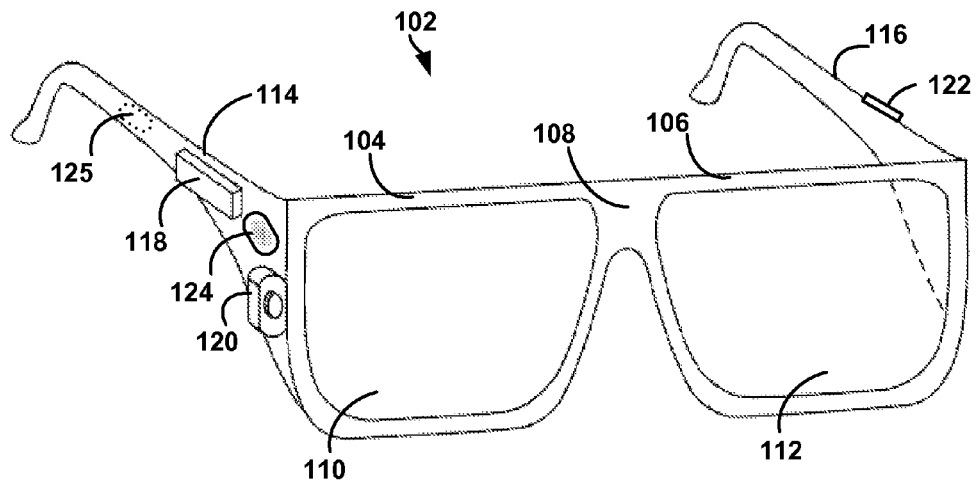
FIG. 1A illustrates a wearable computing system according to an example embodiment.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

One or more input interfaces can be found on a variety of computing devices, including HMD's (head-mountable devices). Typically, an input interface may be configured to detect a limited set of inputs based, in part, on where the input interface is arranged on a computing device. In some applications, it may be useful to arrange multiple input interfaces in an ergonomic manner to allow a user to perform operations that otherwise may be difficult to perform in a different arrangement.

Example embodiments may provide for multiple input interfaces arranged on a housing that is arranged on an HMD. The multiple input interfaces may be arranged in a number of ergonomic configurations that could help a user to conveniently operate the HMD. In some embodiments, a first input interface may be arranged on a first surface of the housing, and the second input interface may be arranged on a second surface of the housing, which is opposite to the first surface. The first surface may be a top, a bottom or a first side surface, and the second surface may be the bottom, the top, or a second side surface, among other possibilities.

The input interfaces may be one of or a combination of several types of input interfaces, such as finger operable touch sensors. The input interfaces may detect input actions and transmit data to a control system of the HMD in response to the detected input actions. The control system may then perform a number of operations in response to the received data.

In example embodiments, the input interfaces may receive a series of input actions and accordingly, transmit a series of data to the control system. In turn, the control system may cause a camera of the device to perform a first camera operation (e.g., zoom the camera, focus the camera, adjust a camera setting, etc.) in accordance with at least one of the input actions and then cause the camera to perform a second camera operation different from the first camera operation in response to another input action.

As such, the configuration of input interfaces may provide the user with ergonomic benefits for performing a camera operation, among other example operations. In some embodiments, where the first input interface is arranged on the bottom surface and the second input interface is arranged on the top surface, when the user positions the user's thumb on the first input interface for one control, the user's middle and pointer fingers may naturally rest on the top surface where the second input interface is arranged. When the user uses both the first and second input interfaces at once, the user may feel as though the user is naturally squeezing the housing, such that the thumb opposes the pointer/middle finger. This accordingly may provide the user with greater control and/or more fine-tuned control of the HMD.

Other applications of the example embodiments described herein are possible. For instance, an ergonomic configuration of input interfaces may be used to initiate and adjust volume control of a speaker. In other instances, an ergonomic configuration of input interfaces may be used to control an audio player (e.g., select, play, pause, or skip a song). Other applications are also possible.

It should be understood that the above embodiments and others described herein are provided for purposes of illustration, and are not intended to be limiting. Variations on the above embodiments and other embodiments are possible, without departing from the scope of the invention as set forth by the claims.

II. Example Wearable Computing Devices

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) that may be used to sense a user's eye movements and/or positioning. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
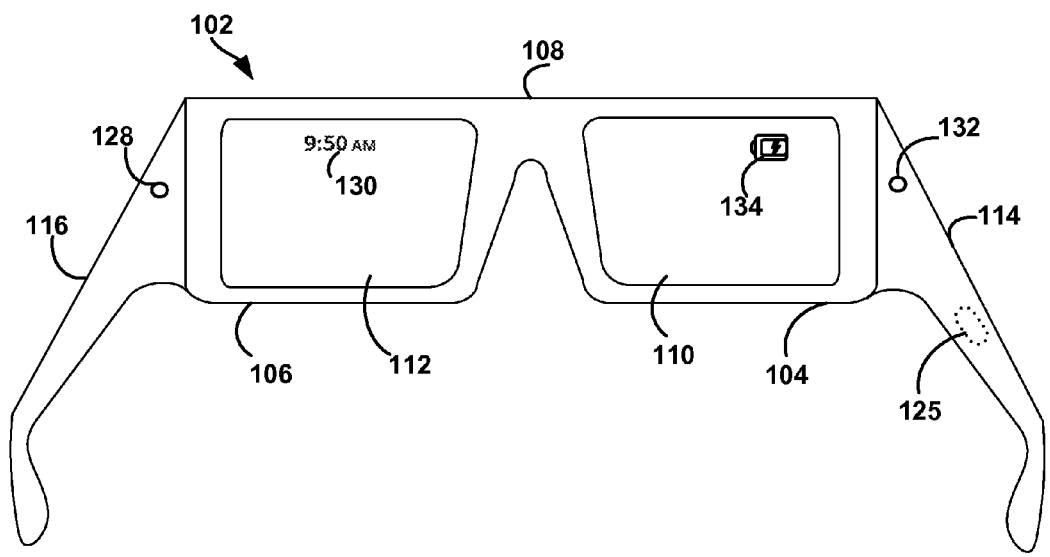
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
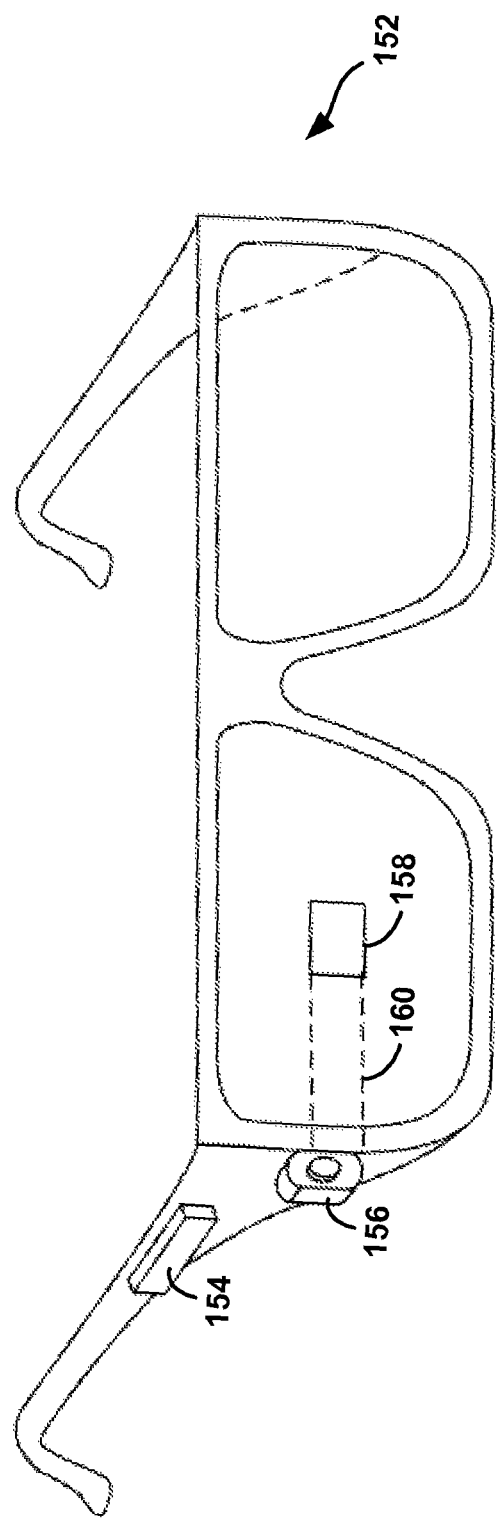
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
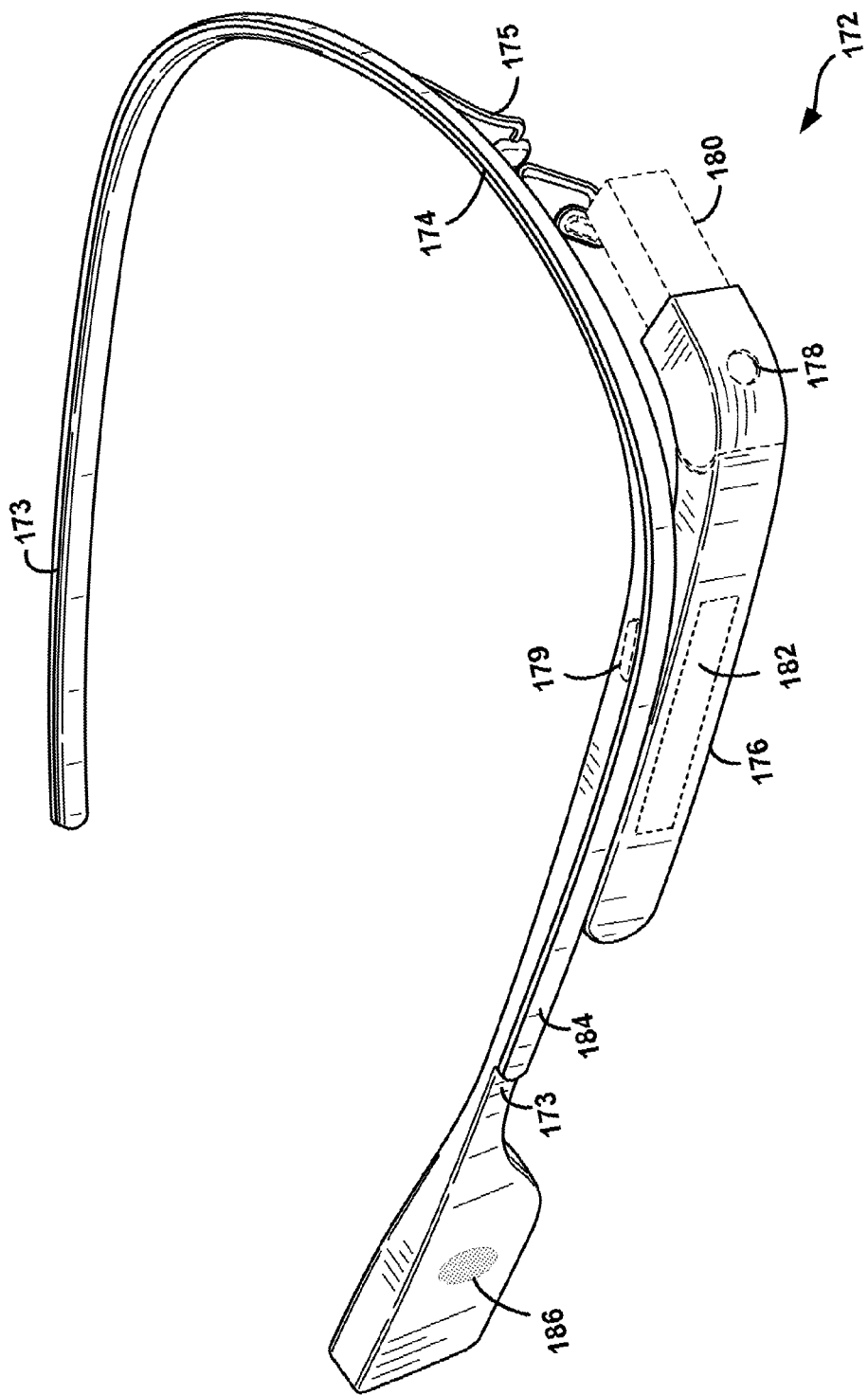
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
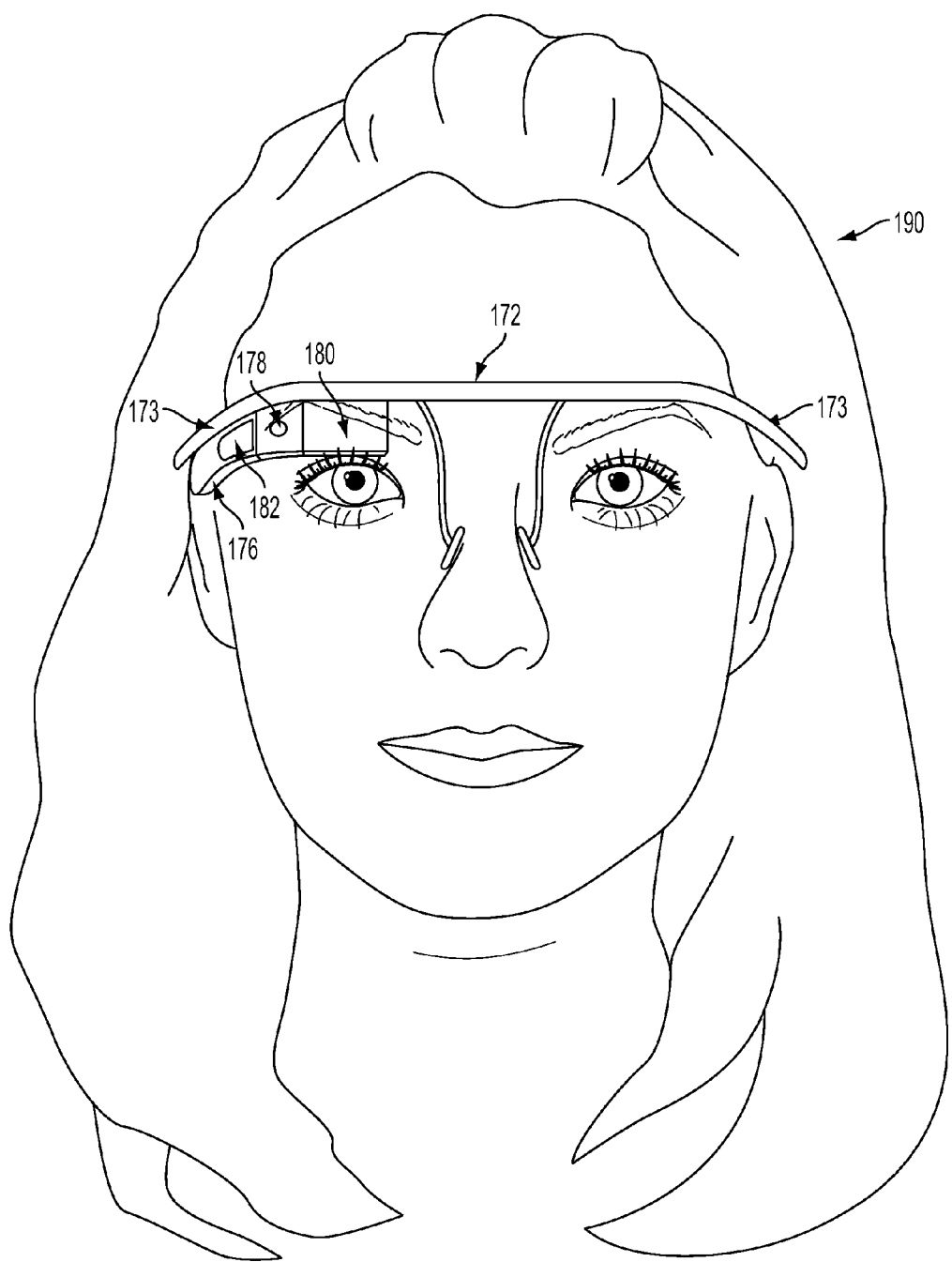
FIGS. 1E to 1G are simplified illustrations of the wearable computing system shown in FIG. 1D, being worn by a wearer.
Figure 1F:
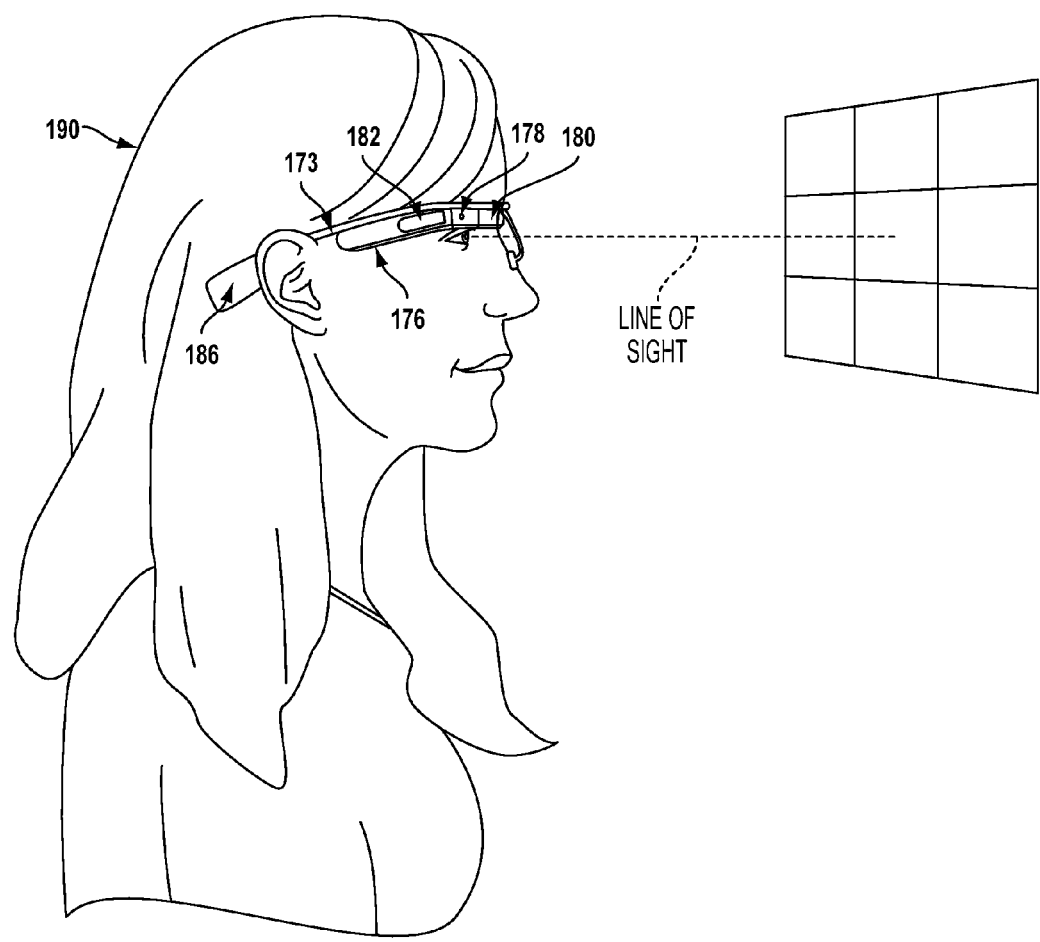
Figure 1G:
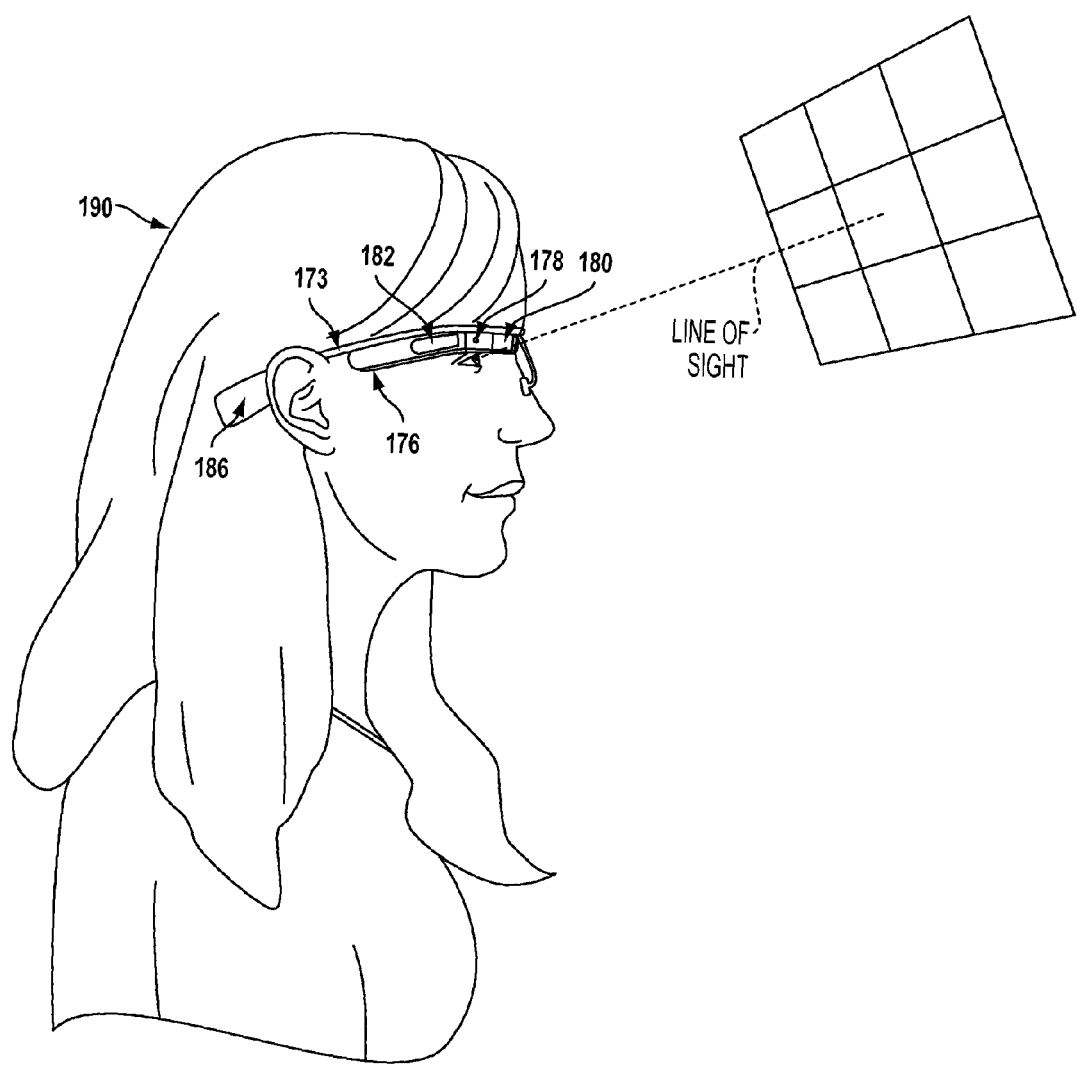

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2:
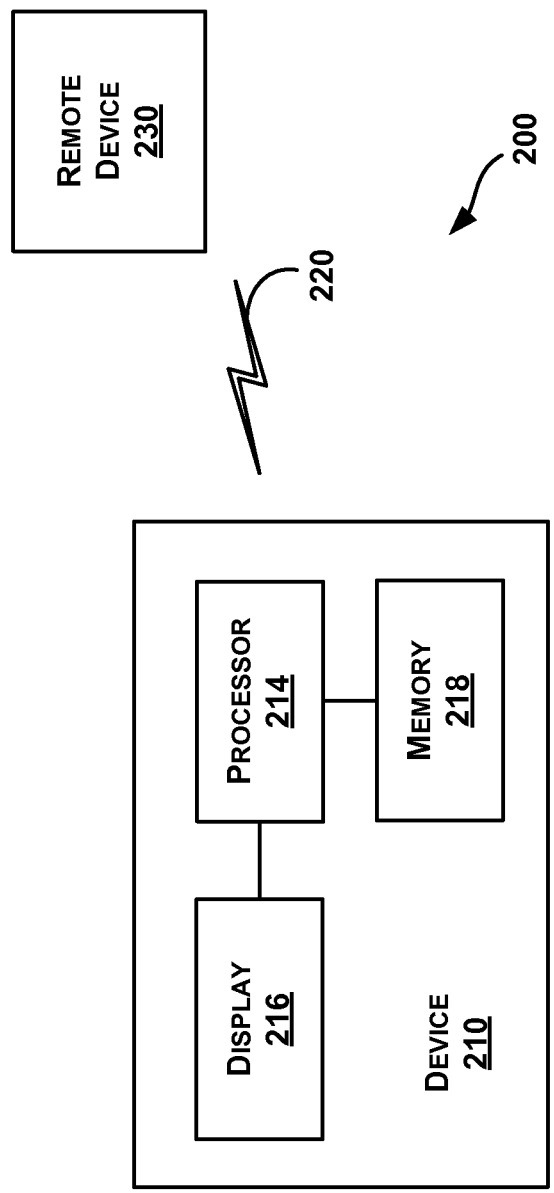
FIG. 2 is a simplified block diagram of a computing device according to an example embodiment.

FIG. 2 is a simplified block diagram of a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may be a heads-up display system, such as the head-mounted devices 102, 152, or 172 described with reference to FIGS. 1A to 1G.

Thus, the device 210 may include a display system 212 comprising a processor 214 and a display 216. The display 210 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, or tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

II. Example Hardware Configurations

An HMD, such as the head-mountable devices 102, 152, or 172, may include a housing (e.g., the component housing 176) that provides one or more input interfaces. The housing may be attached to a side arm of the head-mounted device or the housing may be part of the side arm itself, e.g., the housing may form a segment of, or otherwise be arranged on, the side arm. In other examples, the housing may be arranged on any suitable portion of a head-mountable frame of the head-mountable device, e.g., on any suitable portion of HMD 172 of FIG. 1D, among other possibilities.

The one or more input interfaces may be configured to receive user inputs and send data to a control system of the head-mountable device connected to the one or more input interfaces in response to receiving the user inputs. The control system (e.g., the on-board computing system 118) may be configured to receive the data and cause the performance of an operation in response to the data.

An input interface may be a mechanical button that can be physically depressed (e.g., button 179 in FIG. 1D), a touch sensor, a rocker, a dial, a slider, a switch, or a wheel, among other input interfaces. In some instances, the input interface may include multiple buttons, touch sensors, rockers, dials, sliders, or wheels, or the input interface may include any combination thereof. The touch sensor may be a finger-operable touch pad (e.g., the finger-operable touch pad 124), a single point touch sensor, or a touch sensor configured to detect a "floating touch." A finger-operable touch pad may be configured to receive finger gestures (example finger gestures are described below). In other instances, the touch sensor may be a multi-state touch sensor. For example, the touch sensor may be a three-state sensor whose states include a normal state, a hover state, and a click state. The normal state may indicate that the touch sensor is not currently touched, the hover state may indicate that a finger is hovering (or "floating") above the touch sensor but not touching the touch sensor, and the click state may indicate that the touch sensor is currently being touched. Other example multi-state sensors are also possible.

Figure 3A:
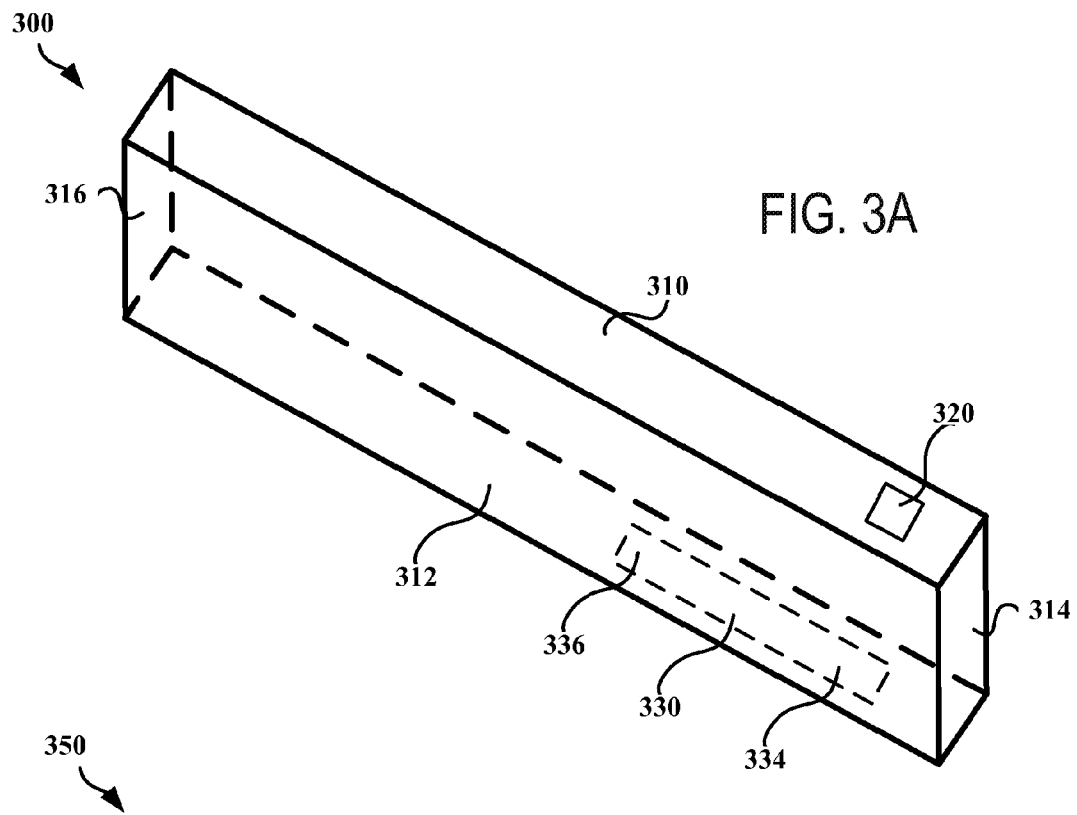
FIG. 3A illustrates an example housing configuration according to an example embodiment.
Figure 3B:
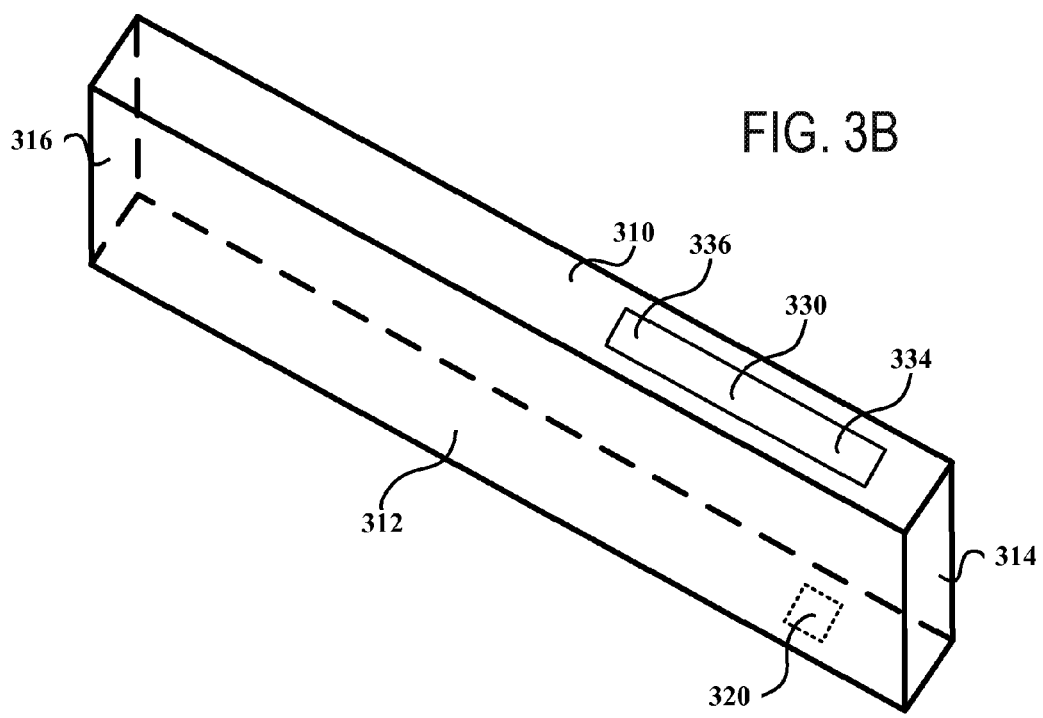
FIG. 3B illustrates another example housing configuration according to an example embodiment.

The one or more input interfaces may be arranged on the housing in a number of different configurations. FIGS. 3A and 3B illustrate simplified examples of housing configurations containing multiple input interfaces according to example embodiments. FIGS. 3A and 3B illustrate a housing which is formed by the union of a superior surface 310, an inferior surface 312, an anterior surface 314, a posterior surface 316 and two side surfaces. The housing may be attached to or otherwise a part of the HMD such that the anterior surface 314 faces the front of the HMD (e.g., the anterior surface 314 may face in the direction of the line of sight of a wearer of the HMD), and the posterior surface 316 faces the back of the HMD (e.g., the posterior surface 316 may face towards the back of the head of a wearer of the HMD). The housing may include a first input interface 330 and a second input interface 320. The first input interface 330 may include an anterior end 334 and a posterior end 336.

In example configuration 300, as shown in FIG. 3A, the second input interface 320 may be arranged on the superior surface 310, and the first input interface 330 may be arranged on the inferior surface 312. In example configuration 350, as shown in FIG. 3B, the second input interface 320 may be arranged on the inferior surface 312, and the first input interface 330 may be arranged on the superior surface 310. Notably, as shown in FIGS. 3A and 3B, the first input interface and the second input interface may be arranged opposite to each other to allow a user to conveniently perform otherwise cumbersome operations on the HMD. That is, the first input interface and the second input interface may be arranged in an ergonomic manner such that a user may perform a thumb gesture at the inferior surface 312, while the user performs another gesture with a remaining finger at the superior surface 310. Other configurations are also possible. For example, the first input interface 330 may be arranged on a first side surface and the second input interface 320 may be arranged on a second side surface that is opposite the first side surface.

In example embodiments, at least one of the input interfaces may be configured to detect finger gestures and transmit data indicating a finger gesture to the control system. The control system may be configured to perform an operation based on the finger gesture. For example, the control system may be configured to perform a camera operation, a volume operation, or an audio player operation, among other operations, in response to a finger gesture.

Generally, a camera operation may involve an adjustment, modification, or selection of one or more camera parameters. For example, a camera operation may involve zooming the camera, adjusting exposure levels, adjusting focus depth, adjusting white balance settings, switching between filters (e.g., a black and white filter, a low-fidelity filter, an early bird filter, a toy camera filter, etc.), switching between stabilization modes, selecting a camera function, or generally navigating camera settings, among other camera operations. It should be understood that a camera operation may involve the performance of one of the above discussed operations while the camera captures video.

A finger gesture may include a finger roll, a finger rub, or a finger swipe, among other finger gestures. The finger gestures will be explained with reference to the first input interface 330 and in the context of a camera operation of zooming a camera. It should be understood that this is for purposes of example and explanation only, and that the described finger gestures may be performed at any other suitable input interface and may cause any of the above mentioned camera operations to occur.

A finger roll may involve rocking a finger back and forth on the first input interface 330 (e.g., in motion similar to a rocking chair). For instance, a finger may begin at the posterior end 336 and roll forward toward the anterior end 334. The control system may be configured to cause a camera to zoom in on an object (or cause a speaker's volume level to increase) in response to such a gesture. A finger roll may begin at the anterior end 334 and roll backward toward the posterior end 336. The control system may be configured to cause a camera to zoom out (or cause a volume level to decrease).

Similarly, a finger rub may involve rubbing (or otherwise sliding) a finger on the first input interface 330 forward or backward. The control system may be configured to cause a camera to zoom in, in response to a forward finger rub (toward the anterior end 334). While the control system may be configured to cause a camera to zoom out, in response to a backward finger rub (toward the posterior end 336).

Further, a finger swipe may involve a brief swipe of a finger on the first input interface 330 forward or backward, e.g., a finger swipe may be a quick finger motion compared to a finger rub. The control system may be configured to cause a camera to zoom out, in response to a forward finger swipe (toward the anterior end 334), and cause the camera to zoom in, in response to a backward finger swipe (toward the posterior end 336).

It should be understood that a forward finger gesture need not begin at the posterior end 336 or a backward finger gesture need not begin at the anterior end 334. Generally, a forward finger gesture is a finger movement that is in the direction towards the anterior end 334, while a backward finger gesture is a finger gesture that is in the direction towards the posterior end 336, regardless of the starting point.

Other finger gestures are also possible. For example, the first input interface 330 may be configured to detect a finger pinch, e.g., an inward pinch or an outward pinch. In another example, the first input interface 330 may be configured to detect a prolonged touch, and the control system may be configured to cause the camera to zoom in or out, if the prolonged touch is detected for more than a predefined amount of time.

III. Example Methods

Figure 4:
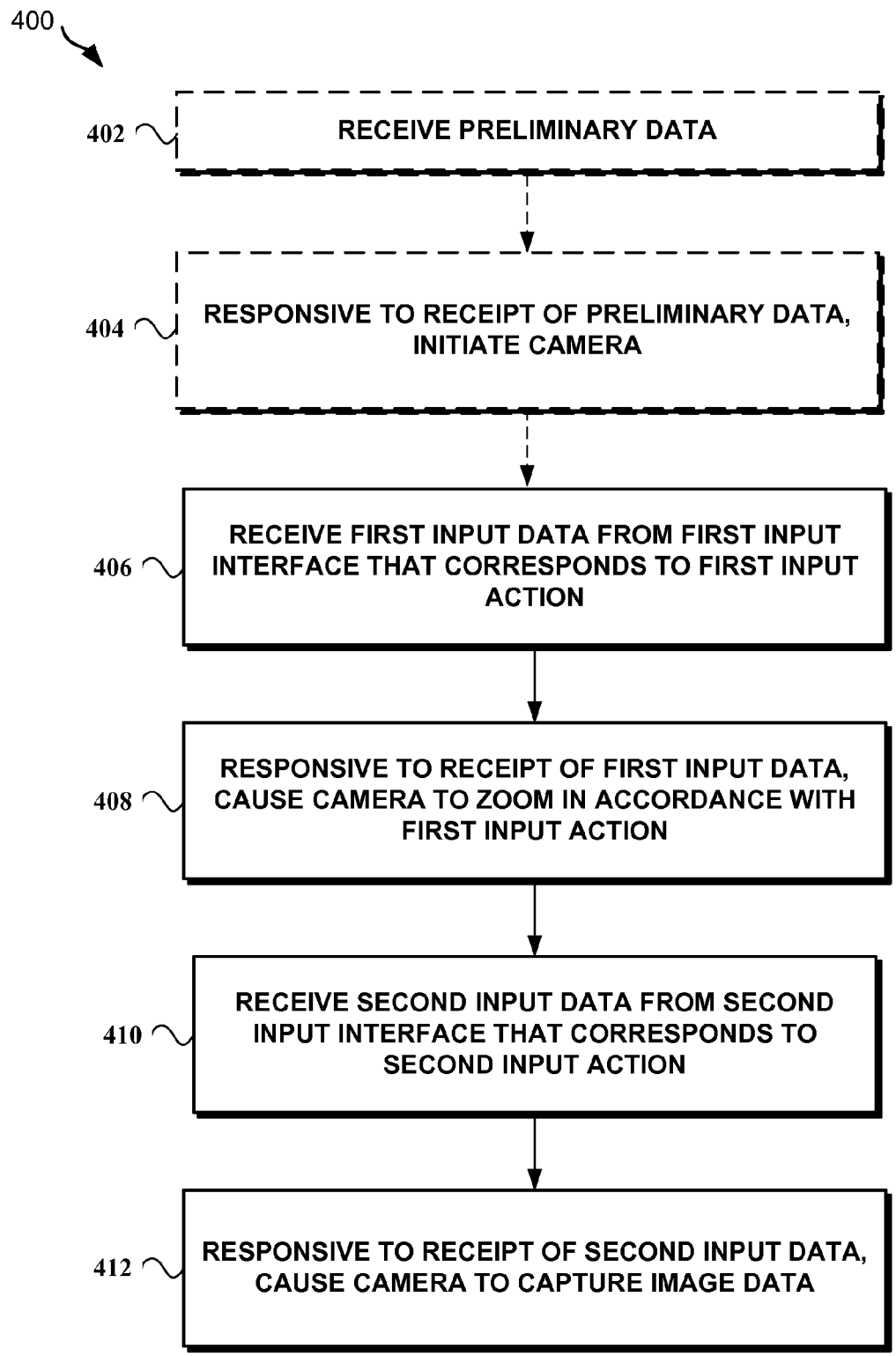
FIG. 4 is a flow chart illustrating a method according to an example embodiment.

FIG. 4 is a flow chart illustrating a method 400, according to an example embodiment. Illustrative methods, such as method 400, may be carried out in whole or in part by an HMD, such as the head-mountable devices shown in FIGS. 1A to 1G. The method 400 may be carried out by components of an HMD, such as a control system. Such a control system may include, for example, a processor and program instructions stored on a non-transitory computer-readable medium. However, an HMD's control system may additionally or alternatively include other components. Further, an example method or portions thereof may be carried out by components of an HMD other than a control system. Yet further, an example method, or portions thereof, may be carried out by a computing device that is in communication with an HMD. An example method may also be carried out by other types of computing devices and/or combinations of computing devices, without departing from the scope of the invention. Other examples of such computing devices include, but are not limited to, other types of wearable computing devices, mobile phones, and tablet computers.

Figure 5A:
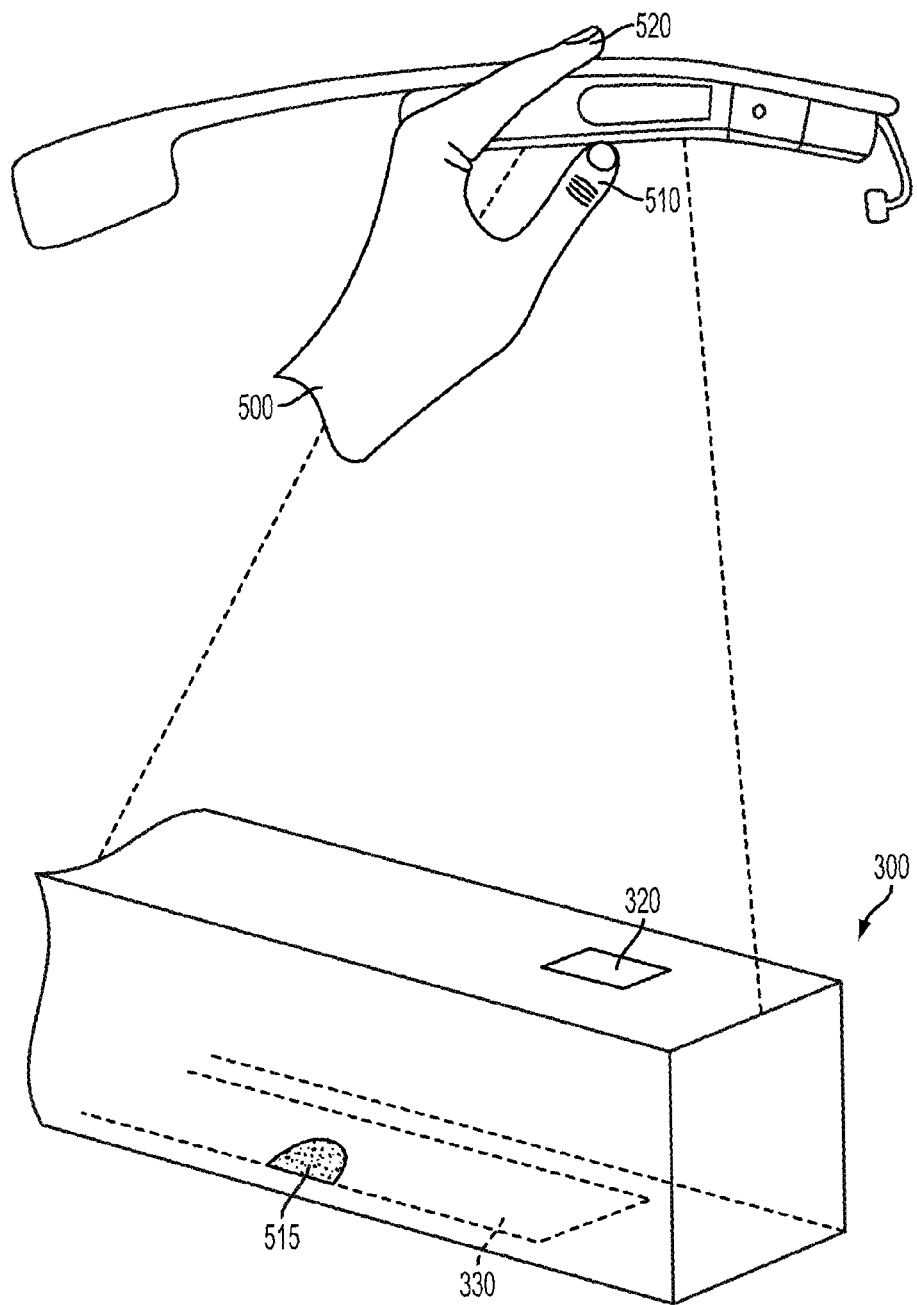
FIG. 5A illustrates a first example use of an example housing, in accordance with an embodiment.
Figure 5B:
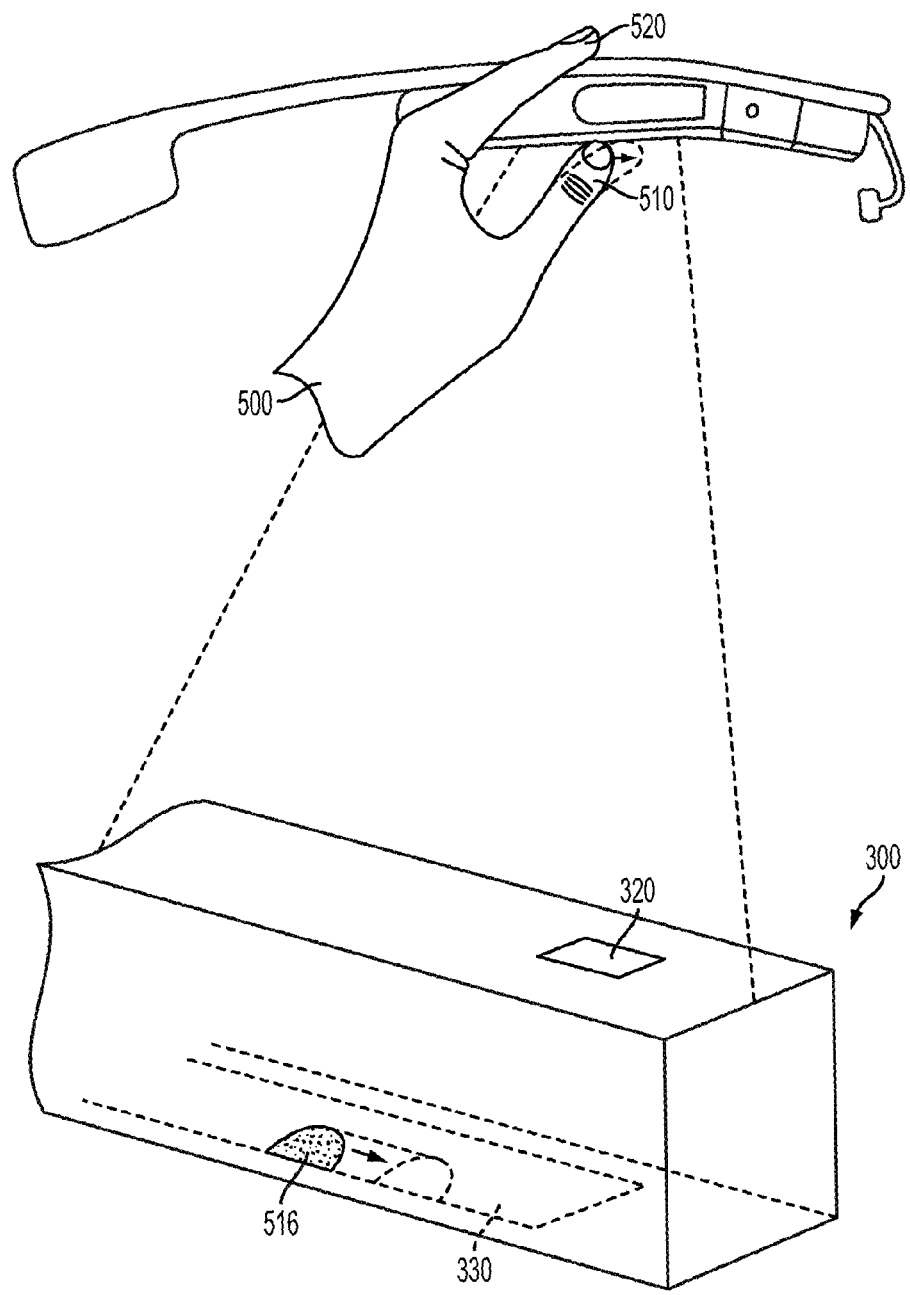
FIG. 5B illustrates a second example use of an example housing, in accordance with an embodiment.
Figure 5C:
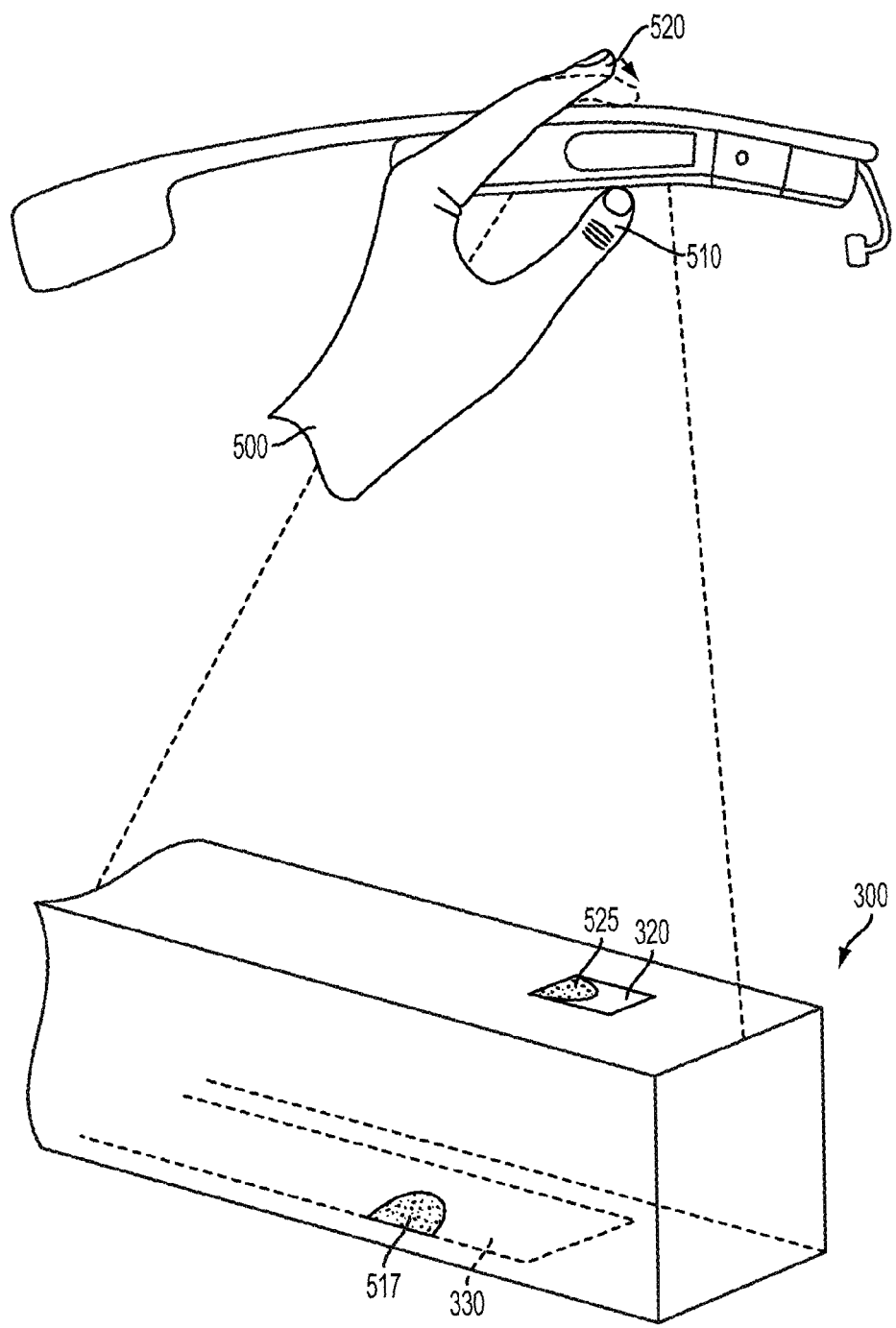
FIG. 5C illustrates a third example use of an example housing, in accordance with an embodiment.
Figure 6A:
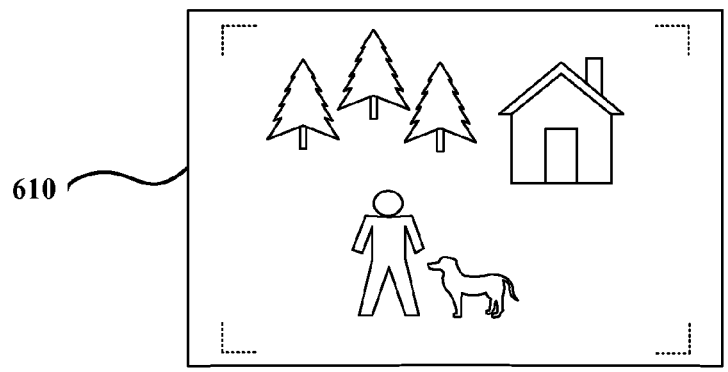
FIG. 6A illustrates a first example camera preview corresponding to use of the example housing as shown in FIG. 5A, in accordance with an embodiment.
Figure 6B:
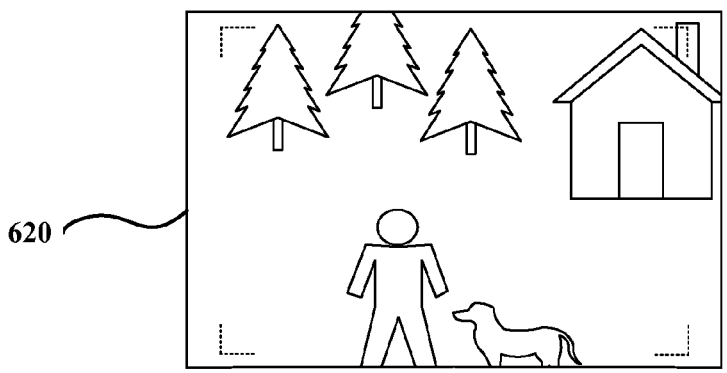
FIG. 6B illustrates a second example camera preview corresponding to use of the example housing as shown in FIG. 5B, in accordance with an embodiment.
Figure 6C:
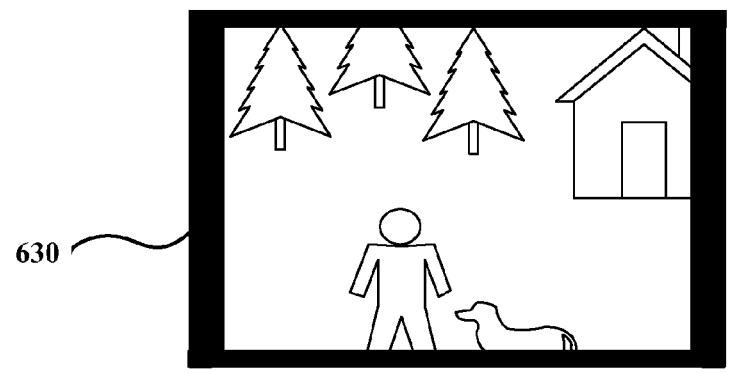
FIG. 6C illustrates a third example camera preview corresponding to use of the example housing as shown in FIG. 5C, in accordance with an embodiment.

For purposes of example and explanation, the method 400 will be described with reference to FIGS. 5A-5C, and FIGS. 6A-6C. FIGS. 5A-5C illustrate example uses of an example housing of an HMD at various points in time. FIGS. 6A-6C illustrate example camera previews corresponding to the example uses as shown in FIGS. 5A-5C. It should be understood that method 400 is described with reference to FIGS. 5A-5C and FIGS. 6A-6C for purposes of example and explanation only and should not be construed to be limiting.

In example embodiments, the method 400 may begin at block 402 with the control system receiving preliminary data from either a first input interface or a second input interface. At block 404, the control system, responsive to the receipt of the preliminary data, initiates a camera. At block 406, the control system receives first input data from the first input interface that corresponds to a first input action. At block 408, the control system, responsive to the receipt of the first input data, causes the camera to perform a first camera operation in accordance with the first input action. At block 410, the control system receives second input data from a second input interface that corresponds to a second input action. At block 412, the control system, responsive to the receipt of the second input data, causes the camera to perform a second camera operation that is different from the first camera operation. In other embodiments, the method 400 may begin at block 406. That is, the control system may already be in a "camera mode" and thus, blocks 402 and 404 may not be necessary (as indicated by the dotted lines in FIG. 4). Each of the blocks shown with respect to FIG. 4 is discussed further below.

a. Receiving Input Data Corresponding to a Preliminary Input Action

The example method 400 beings at block 402 with receiving preliminary data from one of a first input interface and a second input interface that corresponds to a preliminary input action. The first input interface may be the first input interface 330 as described with reference to FIGS. 3A and 3B where the first input interface 330 may be arranged on either the superior surface 310 or the inferior surface 312 of the housing. The second input interface may be the second input interface 320 where the second input interface 320 is arranged on a surface of the housing that is opposite to the first input interface 330. For purposes of example and explanation, the method 400 will be described with reference to the housing configuration 300 of FIG. 3A. As described above, the housing may be arranged on at least one side arm of a head-mountable frame of the HMD The preliminary input action may take the form of any suitable action at either the first input interface or the second input interface, which may depend on the input interface type. For example, the preliminary input action may involve a click or depression of a button, a touch of a touch sensor, a finger hover above a touch sensor, a rocking of a rocker, a turn of a dial, a slide of a slider, a flip of switch, or a spin of a wheel. In other instances, where the input interface is a touch sensor, the preliminary input action may involve a user pressing a finger to the touch sensor and holding the finger for a predefined period of time, or the preliminary input action may involve one of the finger gestures as described above. Other preliminary input actions are also possible. In response to receiving a preliminary input action, the first input interface and the second input interface may be configured to transmit the preliminary data to the control system.

In one example, the preliminary input action may be a touch input at the first input interface. With reference to FIG. 5A, which illustrates an example use of the housing configuration 300 at a first point in time, such a touch input may be performed by a thumb 510 of a user's hand 500. As shown in FIG. 5A, the first input interface 330 may receive a touch input 515 from the thumb 510. The touch input 515 may be a prolonged touch (e.g., for 2 or more seconds) or a brief touch at the first input interface 330, among other touch input examples. The first input interface 330 may be configured to generate data in response to detecting the touch input 515 and transmit the data to the control system of the HMD.

In other embodiments, the preliminary input action may involve an input action at the second input interface. For example, the preliminary input action may involve a user pressing down on the second input interface, which may be, for example, a button. In some embodiments, the preliminary data may be in response to the HMD receiving a voice command from the user. For example, a microphone of the HMD may detect a user say "Camera" or "Let's take a picture", and generate the preliminary data. Other examples are also possible.

b. Initiating a Camera

As shown by block 404, the method 400 may involve initiating a camera of the HMD (e.g., the image capture device 178) in response to the receipt of the preliminary data. Initiating the camera may involve initiating an image-capture preparation process that causes the camera to be ready to capture an image or a video if the user does, in fact, engage in further image-capture steps (described below).

In a further example embodiment, the image-capture preparation process may involve various functions or combinations of functions. As examples, an image-capture preparation process may involve: (a) powering up a camera sensor, (b) powering up a camera chipset, (c) powering up internal cores of the HMD that run camera driver software, (d) pre-allocating memory buffers for the cameras functions, (e) establishing a connection (e.g., an OMX connection) between a main user-space core (such as that of the HMD's operating system) and the camera controller cores, and/or (f) setting default imaging parameters for the camera.

In other embodiments, referring now to FIG. 6A, initiating the camera may involve initiating a camera preview process to acquire a stream of image frames from the camera. For example, as shown, a stream of image frames

610 may depict a scene as viewed by a wearer of the HMD. In some instances, the image frames may then be used to carry out an auto-exposure process, an auto-focus process, and/or an automatic white-balancing process, among other possibilities. Further, such image frames might be used to preview the scene in a viewfinder and/or display of the HMD, e.g., the single display 180.

In some embodiments, in response to the receipt of the preliminary data, the method 400 may further involve causing the control system to operate in a camera mode. That is, before receiving the preliminary data, the control system may be operating in a first mode. In response to receiving the preliminary data, the control system may operate in a second mode (e.g., the camera mode) such that the control system may perform different operations in response to receiving certain data from the first and second input interfaces. For example, while operating in the camera mode, the control system may receive data from the first input interface or the second input interface that corresponds to the same or similar input action as the preliminary input action, but the control system may perform an operation different than initiating the camera.

c. Receiving Input Data Corresponding to a First Input Action

At block 406, the method 400 may involve receiving first input data from the first input interface that corresponds to a first input action. In some embodiments, as discussed above, the method 400 may begin at block 406.

In either case, the first input action may take the form of any suitable action at the first input interface, which may depend on the type of the first input interface. In one example, where the first input interface is a slider, the first input action may involve sliding the slider towards the anterior surface 314 or sliding the slider towards the posterior surface 316. In another example, where the first input interface is a rocker, the first input action may involve rocking the rocker towards the anterior surface 314 or rocking the rocker towards the posterior surface 316. Other examples are also possible. In response to the first input action, the first input interface may be configured to transmit the first input data to the control system In example embodiments, the first input action may be a finger gesture at the first input interface (e.g., any of the finger gestures discussed above). With reference to FIG. 5B, which illustrates an example use of the housing configuration 300 at a second point in time, such a finger gesture may be performed by the thumb 510 (or other finger) of the user's hand 500. As indicated by the motion arrow adjacent to the thumb 510, the thumb 510 may perform the finger gesture by sliding along the first input interface 330. In particular, as shown, the first input interface 330 may receive the finger gesture (here, a forward finger rub) by first detecting a touch input 516 and then detecting the thumb 510 sliding forward, as indicated by the motion arrow adjacent to the finger input 516. The first input interface 330 may be configured to generate data in response to detecting the finger gesture and transmit the data to the control system of the HMD.

In other embodiments, the first input action may be a prolonged touch at the first input interface. For example, the first input action may be the touch input 516 held at the first input interface 330 for a predefined amount of time, e.g., 2 or more seconds. The first input interface 330 may detect the prolonged touch and transmit the first input data to the control system accordingly.

In other embodiments, the control system may be in the camera mode. While in the camera mode, the first input action may be the same as or similar to the preliminary input action as described with reference to block 400, in addition to the above example first input actions.

d. Perform First Camera Operation

As shown by block 408, the method 400 may involve, responsive to receipt of the first input data, causing the camera of the device to perform a first camera operation in accordance with the first input action. In some embodiments, the first camera operation may involve zooming the camera, adjusting exposure levels, adjusting focus depth, adjusting white balance settings, switching between filters, switching between stabilization modes, or navigating camera settings, among other camera operations.

In some embodiments, the camera may, for example, zoom in or zoom out depending on the first input action. For example, the control system may receive the first input data that indicates a forward finger roll, a forward finger rub, a backward finger swipe, a prolonged finger touch, or a finger pinch, among other examples and cause the camera to zoom in. Further, the control system may receive the first input data that indicates a backward finger roll, a backward finger rub, a forward finger swipe, or an outward finger pinch and cause the camera to zoom out. Alternatively, the control system may be configured to perform the opposite zooming operation in response to the described first input actions. Other examples are also possible.

In other embodiments, the camera may increase or decrease exposure levels, focus depth, or white balance settings according to the first input action. For example, a forward finger gesture may cause an increase, while a backward finger gesture may cause a decrease, among other examples. In some embodiments, the camera may cycle through filters, stabilization modes, or camera settings according to the first input action. For example, a forward finger gesture may cause the camera to cycle in one direction, while a backward finger gesture may cause the camera to cycle in a different direction. Other example first camera operations are also possible.

In some embodiments, causing the camera to perform the first camera operation may involve adjusting the camera preview such that the acquired stream of image frames is modified. For example, referring now to FIG. 6B, a stream of image frames 620 may be a zoomed in version of the scene depicted in the stream of image frames 610, in accordance with the first input action (a forward finger rub). Further, such modified image frames might be used to preview the zoomed in scene in the viewfinder and/or display of the HMD.

In other embodiments, causing the camera to perform the first camera operation may be further in response to the control system receiving data from the second input interface. That is, in order to perform the first camera operation using the first input interface 330, a user may also need to provide input at the second input interface 320.

e. Receiving Input Data Corresponding to the Second Input Action

At block 410, the method 400 may involve receiving second input data from the second input interface that corresponds to a second input action. The second input action may take the form of any suitable action at the second input interface, which may depend on the type of the second input interface.

For example, the second input action may involve a click or depression of a button, a touch of a touch sensor, a finger hover above a touch sensor, a rocking of a rocker, a turn of a dial, a slide of a slider, a flip of switch, or a spin of a wheel. In other instances, where the second input interface is a touch sensor, the second input action may involve a user pressing a finger to the touch sensor and holding the finger for a predefined period of time, or the second input action may involve one of the finger gestures as described above. Other example second input actions are also possible. In some embodiments, the second input action may be the same as or similar to the preliminary input action. In response to the second input action, the second input interface may be configured to transmit the second input data to the control system.

In one example, the second input action may be a touch input at the second input interface. With reference to FIG. 5C, which illustrates an example use of the housing configuration 300 at a third point in time, such a touch input may be performed by the pointer finger 520 (or any other finger) of the user's hand 500. As indicated by the motion arrow adjacent to the pointer finger 520, the pointer finger 520 may perform a touch input 525 by touching the second input interface 320. The touch input 525 may be a prolonged touch (e.g., for 2 or more seconds) or a brief touch at the second input interface 320. The second input interface 320 may be configured to generate the second input data in response to detecting the touch input 525 and transmit the second input data to the control system of the HMD.

In some embodiments, the second input data may correspond to a combination of the first input action and the second input action. For example, as shown in FIG. 5C, the first input interface 330 may transmit data corresponding to touch input 517 (which may be where the forward finger rub stopped), and the second input interface 320 may transmit data corresponding to the touch input 525. The control system may interpret this combination of data as the second input data. Other examples are also possible.

Thus, as illustrated in FIGS. 5A-5C, the housing configuration 300 may provide the user with an ergonomic configuration of input interfaces that helps provide a natural and intuitive manner to perform multi-touch camera operations with the HMD. As shown, the ergonomic configuration may allow the user to perform a first camera operation with the thumb 510 at the first input interface 330, while leaving other fingers available to perform a second camera operation (e.g., take a picture or record a video) with the second input interface 320 once the thumb 510 has satisfactorily performed the first camera operation.

In another embodiment, the housing configuration 350 of FIG. 3B may also provide a natural way to perform multi-touch camera operations with the HMD. The user may perform a first camera operation with the pointer finger 520 at the first input interface 330 located on the superior surface 310, and when desired, the user may conveniently use the thumb 510 at the second input interface 320 located on the inferior surface 312 to perform a second camera operation, e.g., capture an image or record a video. The described housing configurations may provide the user with the natural feeling of squeezing the housing while operating the camera, which may provide the user with greater control and/or more fine-tuned control of the HMD.

f. Perform Second Camera Operation

As shown by block 412, the method 400 may involve, responsive to the receipt of the second input data, causing the camera to perform a second camera operation that is different from the first camera operation. In some embodiments, the second camera operation may involve capturing image data in accordance with the first input action. For example, the camera may capture a zoomed in/out image, a low/high level exposure image, a low/high depth focused image, or an image with a particular filter, among other examples. Referring to FIG. 6C, the camera may capture image data 630 that corresponds to the scene depicted in the zoomed in image frame 620. In example embodiments, the second camera operation may involve capturing video data.

In other embodiments, the second camera operation may involve selecting a camera function in accordance with the first input action. For example, the camera may cycle to a desired function of the camera as a result of the first input action, and the second camera operation may involve selecting the desired function and/or initiating an aspect of an image-capture preparation process as indicated by the desired function. Other examples are also possible.

In some embodiments, the second camera operation or the result of the second camera operation may be displayed to the user via the viewfinder and/or display of the HMD. For example, where the second camera operation involves capturing image data, the captured image data may be displayed to the user of the HMD.

It should be understood that any combination of inputs at the first and second input interfaces may result in the camera performing multi-touch operations. Further, the inputs may be any combination of input types. It should be further understood that the blocks of method 400 may be performed in different orders and ultimately cause the camera to perform a first and a second camera operation.

In other embodiments, the second camera operation may involve capturing video data. In such an embodiment, while recording a video, the control system may be configured to modify a video recording setting (e.g., zoom during recording) in response to another input that is the same or similar to the first input action. Other examples are also possible.

In a further aspect of an example method (not shown), the user may provide a preliminary input action at the second input interface 320, which may in turn initiate the camera. For example, the user may touch the second input interface 320 with the user's pointer finger 520 and hold the pointer finger 520 on the second input interface 320. The user may next provide a first input action at the first input interface 330, which may cause the camera to perform a first camera operation, e.g., zoom out. For example, the user may perform a backward finger roll on the first input interface 330 with the user's thumb 510. The user may then remove the thumb 510 from the first input interface 330. As a specific example, the user may remove the user's thumb 510 once the camera has zoomed out to the user's satisfaction. Lastly, the user may remove the pointer finger 520 from the second input interface 320 thereby causing the camera to perform a second camera operation, e.g., capture zoomed out image data according to the backward finger roll. Other examples are certainly possible.

It should further be understood that inputs at the first and second input interfaces could cause the control system to perform other multi-step operations in addition to the above camera example. For example, the method 400 or portions of the method 400 may be utilized to perform controlling an audio source or adjusting the volume of a speaker of the HMD (e.g., the speaker 125 or the BCT 186).

In one such embodiment, the control system may receive preliminary data from either the first input interface or the second input interface that corresponds to a preliminary input action. For example, the user may touch the second input interface 320 with the user's pointer finger 520 and hold the pointer finger 520 on the second input interface 320.

In response to the receipt of the preliminary data, the control system may initiate volume control. For example, the control system may detect a current volume level of a speaker of the HMD and/or the control system may output to a display of the HMD a volume control indicator.

The control system may then receive first input action data that corresponds to a combination of a first input action at the first input interface and a second input action at the second input interface. The first input action may be a finger gesture or any of the input actions described above. Similarly, the second input action may be any of the input actions described above or may be the same as the preliminary input action. For example, while the user is still touching the second input interface 320 with the user's pointer finger 520, the user may provide a finger gesture with the user's thumb 510 at the first input interface 330.

In response to the receipt of the first input data, the control system may perform a volume operation according to the first input action. For example, the control system may increase or decrease the volume level. Further, the control system may also display the change in the volume level at the displayed volume control indicator.

The control system may then receive third input action data corresponding to a third input action at the first input interface or the second input interface. In some embodiments, the third input action data may correspond to a combination of input actions at the first and second input interfaces. The third input action may be any of the input actions described above. In one example, the third input action may be the user removing the thumb 510 from the first input interface 330, among other input actions. In response to the receipt of the third input action data, the control system may perform a second volume operation that is different from the first volume operation, e.g., output audio at the speaker according to the first input action.

Further, the control system may receive a fourth input action corresponding to a fourth input action at the first input interface or the second input interface. In some embodiments, the fourth input action data may correspond to a combination of input actions at the first and second input interfaces. In some embodiments, the fourth input action may be the same as or similar to the third input action. In one example, the third input action may be the user removing the pointer finger 520 from the second input interface 320, among other input actions. In response to the receipt of the fourth input action data, the control system may perform a third volume operation that is different from the first and second volume operations, e.g., no longer display the volume control indicator. Other example multi-step operations may be performed utilizing the ergonomic configuration of the first and second input interfaces described herein.

IV. Conclusion

It should be understood that the examples described with reference to an HMD are not limited to an HMD. It is contemplated that the example methods and systems described with reference to an HMD may be implemented on other types of computing devices, such as other types of wearable devices, mobile phones, tablet computers, and/or laptop computers, for instance.

More generally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A head-wearable device comprising:
a glasses-style frame of the head-wearable device comprising a side-arm configured to be positioned adjacent to a head when the head-wearable device is worn;
a first input interface arranged on a first surface of the side-arm;
a second input interface arranged on a second surface of the side-arm opposite the first input interface, wherein the first surface and the second surface are arranged as an inferior surface and a superior surface of the side-arm, respectively, when the glasses-style head-wearable device is worn, such that the first surface and the second surface are positioned to receive input data from a thumb and another finger on a same hand as the thumb, respectively, when the glasses-style head-wearable device is worn; and
a control system configured to:
receive first input data from the first input interface, and responsive to the receipt of the first input data, cause a camera associated with the head-wearable device to perform a first camera operation in accordance with the first input action;
receive second input data from the second input interface, and responsive to the receipt of the second input data, cause the camera to perform a second camera operation that is different from the first camera operation; and
receive third input data comprising a combination of input data from the first and second input interface, and responsive to the receipt of the third input data, cause the camera to perform a third camera operation that is different from the first and second camera operations, wherein the third input data corresponds to an interaction with the inferiorly-arranged first surface by the thumb and a contemporaneous interaction with the superiorly-arranged second surface by a single other finger on the same hand as the thumb.

2. The head-wearable device of claim 1, wherein the first input interface is one of a button, a touch sensor, a rocker, a dial, a slider, and a multi-state sensor.

3. The head-wearable device of claim 1, wherein the second input interface is one of a button, a touch sensor, a rocker, a dial, a slider, and a multi-state sensor.

4. The head-wearable device of claim 1, wherein the first camera operation comprises adjusting a volume level of a speaker of the head-wearable device.

5. The head-wearable device of claim 1, wherein the control system is further configured to:
operate in a first mode; and
receive preliminary data that corresponds to a preliminary input action, and responsive to the receipt of the preliminary data, cause the control system to operate in a second mode.

6. The head-wearable device of claim 1, wherein the first plurality of gestures is one of a finger roll, a finger rub, a finger swipe, a finger pinch, and a prolonged touch.

7. The head-wearable device of claim 1, wherein the input devices comprise one or more fingers of the hand.

8. A method comprising:
receiving first input data from a first input interface that corresponds to a first input action that is one or more of a first plurality of gestures, wherein the first input interface is arranged on first surface of a side-arm of a glasses-style head-wearable device;
receiving second input data from a second input interface that corresponds to a second input action, wherein the second input interface is arranged on a second surface of the side-arm that is opposite the first input interface, wherein the first surface and the second surface are arranged as an inferior surface and a superior surface of the side-arm, respectively, when the glasses-style head-wearable device is worn, such that the first surface and the second surface are positioned to receive input from a thumb and another finger on a same hand as the thumb, respectively, when the head-wearable device is worn;

responsive to the receipt of the first input data, causing a camera associated with the head-wearable device to perform a first camera operation in accordance with the first input action;

responsive to the receipt of the second input data, causing the camera to perform a second camera operation that is different from the first camera operation;

receiving third input data comprising a combination of input data from the first and second input interface, wherein the third input data corresponds to an interaction with the inferiorly-arranged first surface by the thumb and a contemporaneous interaction with the superiorly-arranged second surface by a single other finger on the same hand as the thumb; and responsive to the receipt of the third input data, causing the camera to perform a third camera operation that is different from the first and second camera operations.

9. The method of claim 8, wherein the first camera operation comprises adjusting a volume level of a speaker of the head-wearable device.

10. The method of claim 8, wherein the first plurality of gestures is one of a finger roll, a finger rub, a finger swipe, a finger pinch, and a prolonged touch.

11. The method of claim 8, wherein the second plurality of gestures is one of a finger roll, a finger rub, a finger swipe, and a prolonged touch.

12. A non-transitory computer readable memory having stored therein instructions executable by a computing device to cause the computing device to perform functions comprising:

receiving first input data from a first input interface that corresponds to a first input action that is one or more of a first plurality of gestures, wherein the first input interface is arranged on first surface of a side-arm of a glasses-style head-wearable device;

receiving second input data from a second input interface that corresponds to a second input action, wherein the second input interface is arranged on a second surface of the side-arm that is opposite the first input interface, wherein the first surface and the second surface are arranged as an inferior surface and a superior surface of the side-arm, respectively, when the glasses-style head-wearable device is worn, such that the first surface and the second surface are positioned to receive input from a thumb and another finger on a same hand as the thumb, respectively, when the head-wearable device is worn;

responsive to the receipt of the first input data, causing a camera associated with the head-wearable device to perform a first camera operation in accordance with the first input action;

responsive to the receipt of the second input data, causing the camera to perform a second camera operation that is different from the first camera operation;

receiving third input data comprising a combination of input data from the first and second input interface, wherein the third input data corresponds to an interaction with the inferiorly-arranged first surface by the thumb and a contemporaneous interaction with the superiorly-arranged second surface by a single other finger on the same hand as the thumb; and responsive to the receipt of the third input data, causing the camera to perform a third camera operation that is different from the first and second camera operations.

13. The non-transitory computer readable memory of claim 12, wherein the first plurality of gestures is one of a finger roll, a finger rub, a finger swipe, a finger pinch, and a prolonged touch.

14. The non-transitory computer readable memory of claim 12, wherein the input devices comprise one or more fingers of the hand.

* * * * *